United States Patent
Jaradi et al.

(10) Patent No.: US 11,554,749 B2
(45) Date of Patent: Jan. 17, 2023

(54) LOAD-LIMITING SEATBELT RETRACTOR

(71) Applicant: Ford Global Technologies, LLC, Dearborn, MI (US)

(72) Inventors: Dean M. Jaradi, Macomb, MI (US); S. M. Iskander Farooq, Novi, MI (US); Mohammad Omar Faruque, Ann Arbor, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 477 days.

(21) Appl. No.: 16/750,782

(22) Filed: Jan. 23, 2020

(65) Prior Publication Data

US 2021/0229624 A1    Jul. 29, 2021

(51) Int. Cl.
 *B60R 22/34* (2006.01)
(52) U.S. Cl.
 CPC ...... *B60R 22/34* (2013.01); *B60R 2022/3402* (2013.01)
(58) Field of Classification Search
 CPC ... B60R 22/32; B60R 22/34; B60R 2022/283; B60R 2022/287; B60R 2022/289; B60R 2022/328; B60R 2022/3402
 See application file for complete search history.

(56) References Cited

U.S. PATENT DOCUMENTS

| | | |
|---|---|---|
| 5,823,570 A | 10/1998 | Lane, Jr. et al. |
| 5,836,534 A | 11/1998 | Bohmler |
| 6,336,606 B1 * | 1/2002 | Smithson ............... B60R 22/34 242/376 |
| 6,416,008 B1 | 7/2002 | Fujii et al. |
| 6,692,027 B2 | 2/2004 | Siegfried et al. |
| 7,350,735 B2 | 4/2008 | Hiramatsu et al. |
| 7,354,014 B2 * | 4/2008 | Hiramatsu ............. B60R 22/28 242/382 |
| 7,744,029 B2 | 6/2010 | Gentner |
| 9,789,848 B2 | 10/2017 | Jaradi et al. |
| 2019/0031136 A1 | 1/2019 | Jaradi et al. |

FOREIGN PATENT DOCUMENTS

| | | |
|---|---|---|
| GB | 2525154 A | 10/2015 |
| KR | 100649309 B1 | 11/2006 |
| WO | 2017162167 A1 | 9/2017 |

* cited by examiner

*Primary Examiner* — Sang K Kim
(74) *Attorney, Agent, or Firm* — Frank A. MacKenzie; Bejin Bieneman PLC

(57) ABSTRACT

A restraint system includes a retractor housing; a spool rotatably coupled to the retractor housing and defining an axis of rotation; a torsion bar elongated along the axis of rotation and positioned coaxially in the spool; a cylinder elongated along the axis of rotation, extending coaxially around the torsion bar, and positioned coaxially in the spool; and a cutter fixed to the spool, the cutter including a cutting edge engaging the cylinder.

17 Claims, 3 Drawing Sheets

LOAD-LIMITING SEATBELT RETRACTOR

BACKGROUND

Vehicles include restraint systems. The restraint system for a seat of a vehicle is typically a three-point harness, meaning that webbing is attached at three points around the occupant when fastened: an anchor, a retractor, and a buckle. The anchor fixes one end of the webbing. The other end of the webbing feeds into the retractor, which may include a spool that extends and retracts the webbing. A clip slides freely along the webbing and, when engaged with the buckle, divides the webbing into a lap band and a shoulder band.

DETAILED DESCRIPTION

Figure 1:
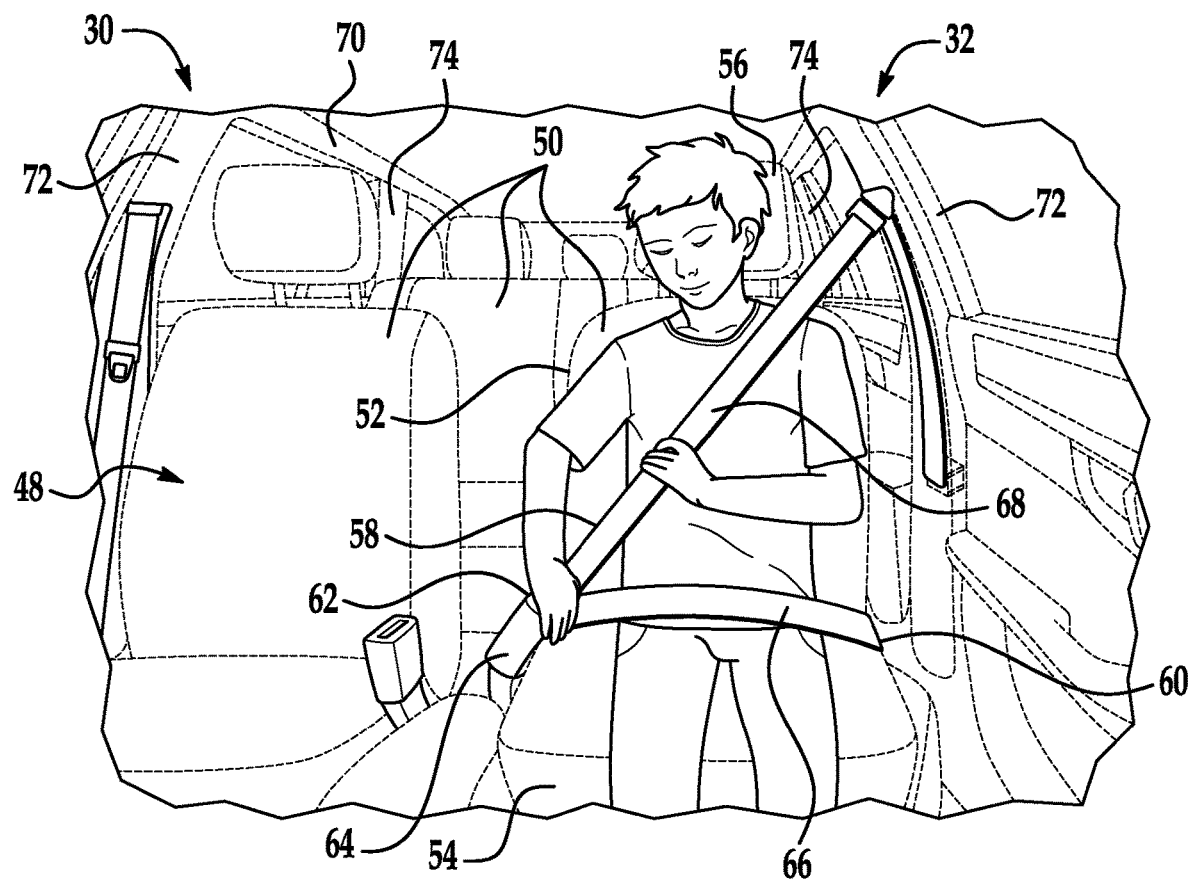
FIG. 1 is a front view of a vehicle including a restraint system.

A restraint system includes a retractor housing; a spool rotatably coupled to the retractor housing and defining an axis of rotation; a torsion bar elongated along the axis of rotation and positioned coaxially in the spool; a cylinder elongated along the axis of rotation, extending coaxially around the torsion bar, and positioned coaxially in the spool; and a cutter fixed to the spool, the cutter including a cutting edge engaging the cylinder.

The torsion bar may be elongated along the axis of rotation from a first end to a second end, and the first end of the torsion bar may be fixed relative to the spool. The cylinder may be elongated along the axis of rotation from a first end to a second end, and the second end of the cylinder may be fixed to the second end of the torsion bar. The first end of the cylinder may be free.

The restraint system may further include a locking mechanism movable between an engaged state and a disengaged state, and the locking mechanism in the engaged state may lock the second end of the torsion bar to the retractor housing, and the locking mechanism in the disengaged state may permit rotation of the second end of the torsion bar relative to the retractor housing.

The torsion bar may include a first-end portion extending along the axis of rotation from the first end, a second-end portion extending along the axis of rotation from the second end, and a middle portion extending along the axis of rotation from the first-end portion to the second-end portion, and a cross-sectional area of the middle portion along a plane orthogonal to the axis of rotation may be smaller than a cross-sectional area of the second-end portion along a plane orthogonal to the axis of rotation. The cross-sectional area of the middle portion along a plane orthogonal to the axis of rotation may be smaller than a cross-sectional area of the first-end portion along a plane orthogonal to the axis of rotation.

The first-end portion, the second-end portion, and the middle portion may be cylindrical, a diameter of the middle portion may be shorter than a diameter of the second-end portion, and the diameter of the middle portion may be shorter than a diameter of the first-end portion.

The cylinder may extend from the first-end portion to the second-end portion.

The cylinder may include an outer surface facing radially outward and a notch extending radially inward from the outer surface, and the cutting edge may be disposed in the notch. The cylinder may include an inner surface facing radially inward, and the notch may extend only partially from the outer surface to the inner surface.

The spool may include a slot, and the restraint system may further include webbing extending through the slot. The slot may be a first slot, the spool may include a second slot positioned more than 90° around the axis of rotation from the first slot, and the webbing may extend from the first slot inside the spool to the second slot.

The restraint system may further include a spring coupled to the spool and coupled to the retractor housing, and the spring may be a coil spring.

The cutter may be positioned to cut a circumferential channel into the cylinder as the spool rotates about the axis of rotation relative to the cylinder.

The cutter may be oriented such that when the spool rotates in an extractive direction relative to the cylinder about the axis, the cutting edge cuts into the cylinder. The restraint system may further include a spring coupled to the spool and coupled to the retractor housing, and the spring may be preloaded to apply a torque to the spool in a retractive direction opposite the extractive direction.

With reference to the Figures, a restraint system 32 for a vehicle 30 includes a retractor housing 34; a spool 36 rotatably coupled to the retractor housing 34 and defining an axis R of rotation; a torsion bar 38 elongated along the axis R and positioned coaxially in the spool 36; a cylinder 40 elongated along the axis R, extending coaxially around the torsion bar 38, and positioned coaxially in the spool 36; and a cutter 42 fixed to the spool 36. The cutter 42 includes a cutting edge 44 engaging the cylinder 40.

The restraint system 32 provides for a retractor 46 that is compact and inexpensive. The retractor 46 uses a small number of components and conveniently packages several of the components, such as the torsion bar 38, the cylinder 40, and the cutter 42, inside the spool 36. Furthermore, the retractor 46 provides digressive load limiting, in which the force resisting forward motion of the occupant's torso decreases over time as webbing 58 is extracted from the retractor 46. The retractor 46 provides comparatively higher resistance during a first rotation of the spool 36 relative to the cylinder 40 and comparatively lower resistance after the first rotation. Moreover, because the cylinder 40 is a separate component from the spool 36, the choices of materials and the dimensions of the cylinder 40 and the spool 36 can be different and independently optimized.

With reference to FIG. 1, the vehicle 30 may be any passenger or commercial automobile such as a car, a truck, a sport utility vehicle, a crossover, a van, a minivan, a taxi, a bus, etc.

The vehicle 30 includes a passenger cabin 48 to house occupants, if any, of the vehicle 30. The passenger cabin 48 includes a plurality of seats 50, e.g., one or more front seats 50 disposed at a front of the passenger cabin 48 and one or more back seats 50 disposed behind the front seats 50. The passenger cabin 48 may also include third-row seats 50 at a rear of the passenger cabin 48. The position and orientation of the seats 50 and components thereof may be adjustable by an occupant. The rest of this description discusses the restraint system 32 for one seat 50, but multiple or all seats 50 in the passenger cabin 48 can each have a restraint system 32. The seat 50 is shown to be a bucket seat, but the seat 50 may be another type.

The seat 50 may include a seat back 52, a seat bottom 54, and a head restraint 56. The head restraint 56 may be supported by the seat back 52 and may be stationary or movable relative to the seat back 52. The seat back 52 may be supported by the seat bottom 54 and may be stationary or movable relative to the seat bottom 54. The seat back 52, the seat bottom 54, and/or the head restraint 56 may be adjustable in multiple degrees of freedom. Specifically, the seat back 52, the seat bottom 54, and/or the head restraint 56 may themselves be adjustable, in other words, adjustable components within the seat back 52, the seat bottom 54, and/or the head restraint 56, and/or may be adjustable relative to each other.

The restraint system 32 includes the retractor 46, the webbing 58 retractably payable from the retractor 46, an anchor 60 coupled to the webbing 58, and a clip 62. The clip 62 may be adjustable along the webbing 58 and may selectively engage a buckle 64 fixed relative to the seat 50. The restraint system 32, when fastened, retains the occupant on the seat 50, for example, during sudden decelerations of the vehicle 30.

The anchor 60 attaches one end of the webbing 58 relative to a body of the vehicle 30, e.g., to the seat 50. The other end of the webbing 58 feeds into the retractor 46 and is attached to the spool 36, with the webbing 58 wound around the spool 36 beginning at that end. The webbing 58 can be formed of a fabric in the shape of a strap. The clip 62 slides freely along the webbing 58 and, when engaged with the buckle 64, divides the webbing 58 into a lap band 66 and a shoulder band 68.

The restraint system 32 of FIG. 1 is a three-point harness, meaning that the webbing 58 is attached at three points around the occupant when fastened: the anchor 60, the retractor 46, and the buckle 64. The restraint system 32 may, alternatively, include another arrangement of attachment points.

The retractor 46 can be attached to a vehicle body 70 of the vehicle 30, e.g., to a B pillar 72 in the instance the seat 50 is a front seat, to a C pillar 74 when the seat 50 is a rear seat, etc. The retractor 46 may alternatively be mounted to the seat 50.

Figure 2:
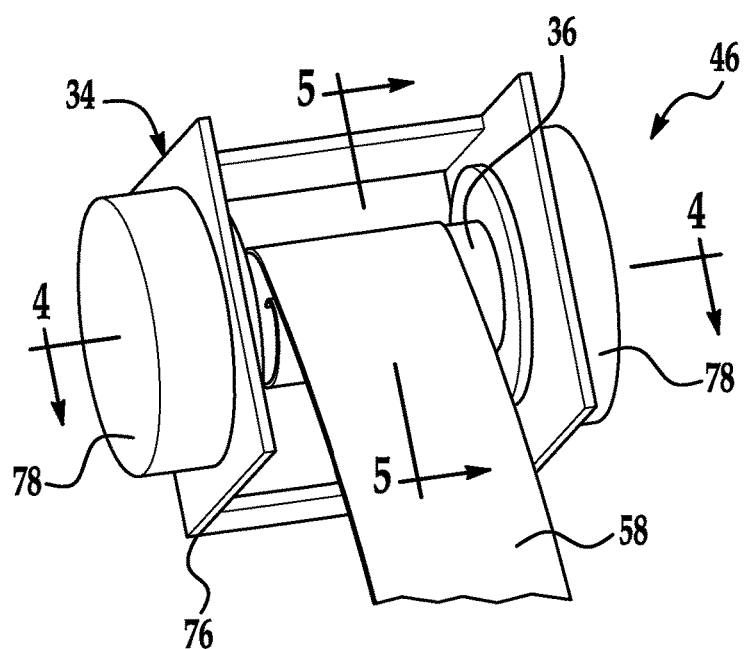
FIG. 2 is a perspective view of a retractor of the restraint system.

With reference to FIG. 2, the retractor 46 includes the retractor housing 34. The retractor housing 34 can include a housing body 76 and housing covers 78 attached to the housing body 76. The retractor housing 34 may be formed of metal or plastic. The retractor housing 34 may be mounted to the vehicle body 70 of the vehicle 30, e.g., to the B pillar 72 in the instance the seat 50 is a front seat, to the C pillar 74 when the seat 50 is a rear seat, or may be mounted to the seat 50.

The spool 36 is rotatably coupled to the retractor housing 34. The spool 36 can freely rotate relative to the retractor housing 34, and is fixed to the retractor housing 34 in all other degrees of freedom. The spool 36 can be cylindrical in shape. The spool 36 defines the axis R, about which the spool 36 rotates. The spool 36 extends along the axis R from a first end 80 to a second end 82. The spool 36 includes flanges at the first end 80 and at the second end 82.

Figure 5:
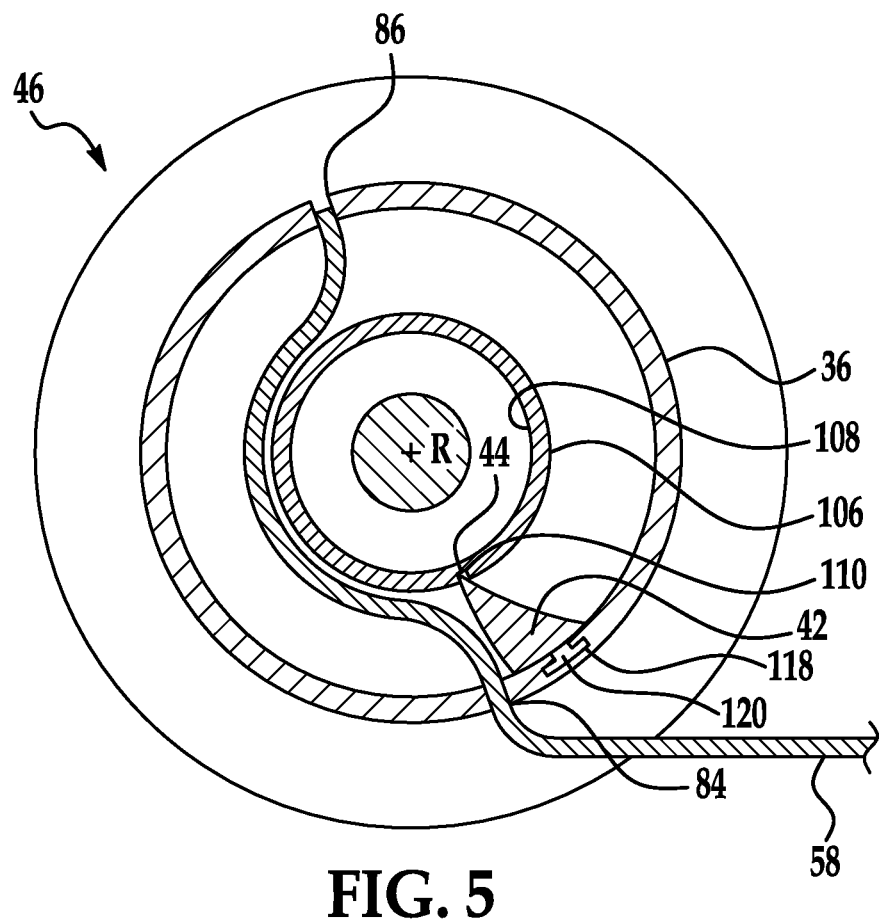
FIG. 5 is a cross-sectional view of the retractor along line 5-5 in FIG. 2.

With reference to FIG. 5, the spool 36 can be adapted to receive the webbing 58, for example, by including a first slot 84 and permitting the webbing 58 to wind around an outside of the spool 36 starting from the first slot 84. The spool 36 includes a second slot 86 positioned more than 90°, e.g., approximately 180°, around the axis R from the first slot 84.

The first slot 84 and second slot 86 are elongated parallel to the axis R. The webbing 58 extends from outside the spool 36 through the first slot 84 and from the first slot 84 inside the spool 36 to the second slot 86. The webbing 58 extends from the first slot 84 in a circumferential direction away from the cutter 42 and then curves around the cylinder 40 to the second slot 86.

Returning to FIG. 3, a spring 88 is coupled to the spool 36 and to the retractor housing 34. The spring 88 is preloaded to apply a torque to the spool 36 in a retractive direction, i.e., a direction tending to retract the webbing 58. The spring 88 may be loaded in tension or compression when the webbing 58 is fully retracted, and the spring 88 may be further loaded in either tension or compression when the webbing 58 is extracted from the spool 36. Thus, the spring 88 exerts a torque in the retractive direction. The spring 88 may be a coil spring or any other suitable type of spring.

Figure 4:
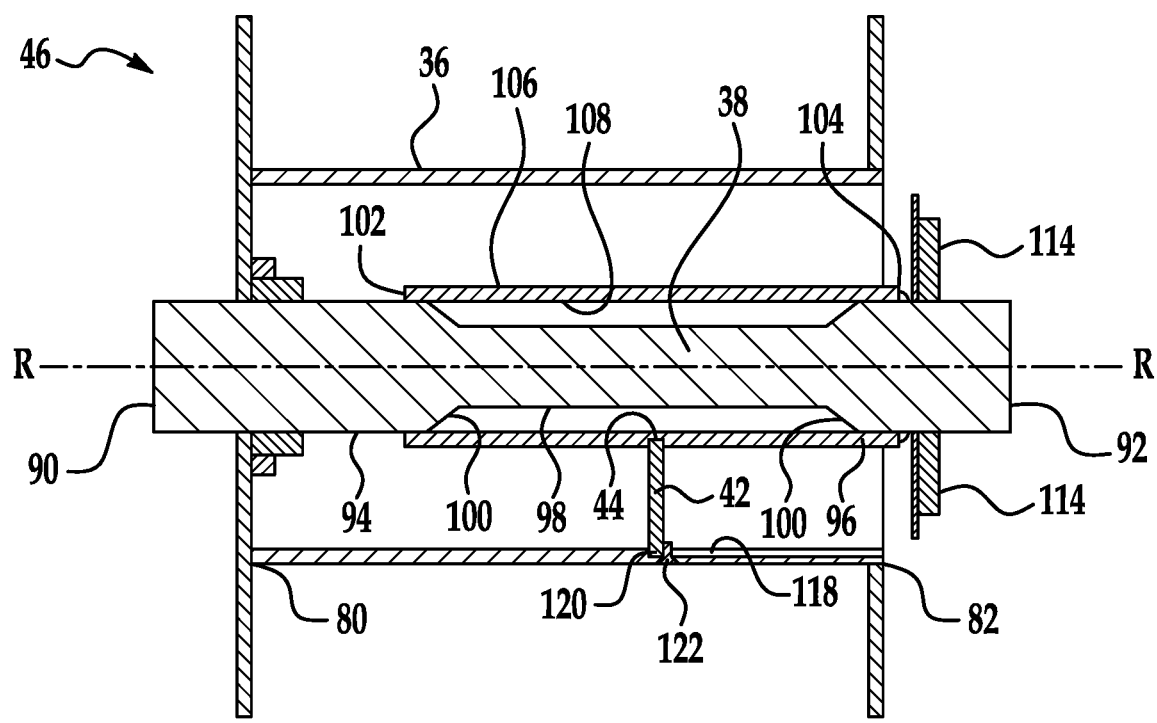
FIG. 4 is a cross-sectional view of the retractor along line 4-4 in FIG. 2.

With reference to FIG. 4, the torsion bar 38 is elongated along the axis R from a first end 90 to a second end 92. The first end 90 of the torsion bar 38 is positioned axially at the first end 80 of the spool 36, and the second end 92 of the torsion bar 38 is positioned axially at the second end 82 of the spool 36. The torsion bar 38 is centered on the axis R. The torsion bar 38 is positioned coaxially and concentrically in the spool 36.

The torsion bar 38 is a solid of revolution around the axis R, i.e., a solid figure obtained by rotating a plane curve around a straight line (in this case, the axis R) in the same plane as the plane curve. The torsion bar 38 includes a first-end portion 94 extending along the axis R from the first end 90 toward the second end 92, a second-end portion 96 extending along the axis R of rotation from the second end 92 toward the first end 90, and a middle portion 98 extending along the axis R from the first-end portion 94 to the second-end portion 96. The first-end portion 94, the middle portion 98, and the second-end portion 96 each have a constant cross-section projected along the axis R. A cross-sectional area of the first-end portion 94 along a plane orthogonal to the axis R is substantially equal to a cross-sectional area of the second-end portion 96 along a plane orthogonal to the axis R, and a cross-sectional area of the middle portion 98 along a plane orthogonal to the axis R is smaller than the cross-sectional area of the first-end portion 94 and smaller than the cross-sectional area of the second-end portion 96. The first-end portion 94, the middle portion 98, and the second-end portion 96 are cylindrical, and the first-end portion 94 and the second-end portion 96 can each include a chamfer 100 connecting to the middle portion 98. A diameter of the first-end portion 94 is substantially equal to a diameter of the second-end portion 96, and a diameter of the middle portion 98 is shorter than the diameter of the first-end portion 94 and shorter than the diameter of second-end portion 96. The smaller cross-section of the middle portion 98 than the first-end portion 94 and second-end portion 96 helps ensure that yielding from twisting the torsion bar 38 occurs in the middle portion 98 rather than the first-end portion 94 or the second-end portion 96.

The first end 90 of the torsion bar 38 is fixed relative to the spool 36. For example, the first end 90 of the torsion bar 38 can be attached, e.g., welded or keyed, to the first end 80 of the spool 36. The first end 90 of the torsion bar 38 is rotationally locked to the first end 80 of the spool 36 around the axis R. The torsion bar 38 is not attached to the spool 36 other than at the first end 90 of the torsion bar 38.

The cylinder 40 is elongated along the axis R from a first end 102 to a second end 104. The cylinder 40 extends axially from the first-end portion 94 to the second-end portion 96.

The middle portion 98 is between the first end 102 and second end 104 of the cylinder 40 along the axis R, and the first end 102 and the second end 104 of the cylinder 40 are spaced along the axis R from the middle portion 98. The cylinder 40 extends coaxially and concentrically around the torsion bar 38, and the cylinder 40 is positioned coaxially and concentrically in the spool 36.

The cylinder 40 has a tubular cylindrical shape. The cylinder 40 has a cross-sectional shape orthogonal to the axis R of a circular wall of constant radial thickness, and the cross-sectional shape is projected along the axis R from the first end 102 to the second end 104. The cylinder 40 includes an outer surface 106 facing radially outward from the axis R and an inner surface 108 facing radially inward toward the axis R.

The second end 104 of the cylinder 40 is fixed to the second end 92 of the torsion bar 38. For example, the second end 104 of the cylinder 40 is welded to the second-end portion 96 of the torsion bar 38. The cylinder 40 is unattached to other components of the retractor 46 except at the second end 104. The first end 102 of the cylinder 40 is free, i.e., unattached to other components.

With reference to FIGS. 4 and 5, the cylinder 40 includes a notch 110 extending radially inward from the outer surface 106 partially to the inner surface 108. The notch 110 is positioned to receive the cutting edge 44 of the cutter 42.

Figure 3:
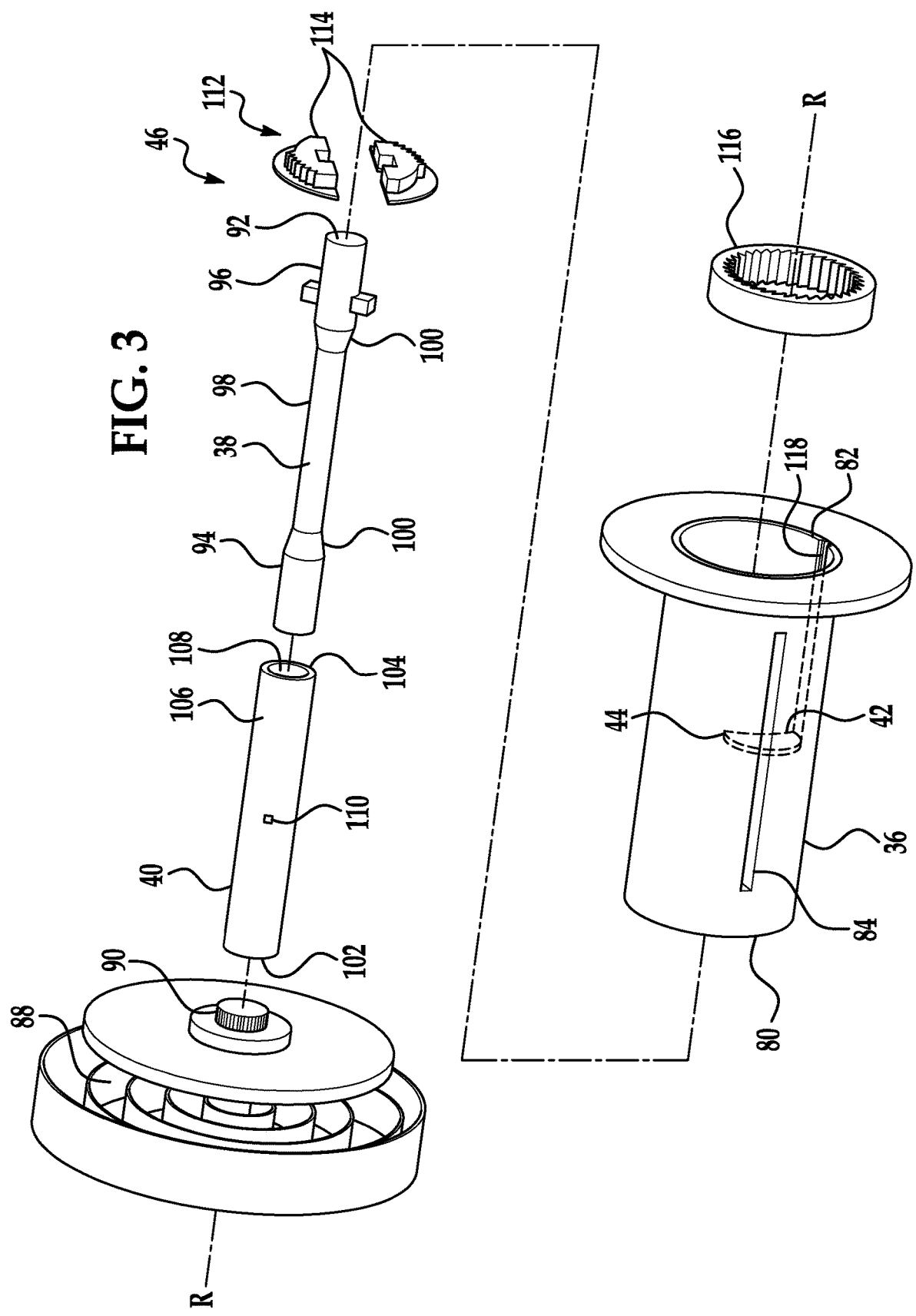
FIG. 3 is an exploded view of the retractor.

The cutter 42 is fixed to the spool 36. For example, the spool 36 includes a groove 118 extending longitudinally from one of the ends 80, 82, e.g., from the second end 82, as shown in FIGS. 3 and 4, to a position spaced from both ends 80, 82. The groove 118 can, e.g., have a T-shaped cross-section projected parallel to the axis R. The cutter 42 can include a head 120 shaped to slide longitudinally in the groove 118 and to shaped to prevent the head 120 from leaving the groove 118 or rotating in the groove 118. For example, the head 120 can have a T-shaped cross-section matching the cross-section of the groove 118. A set screw 122 extends through the spool 36 and is positioned to prevent the cutter 42 from moving away from the position spaced from both ends 80, 82. For example, the set screw 122 can be next to and contacting the cutter, as shown in FIG. 4. Alternatively, the set screw 122 can extend into the cutter 42. To install the cutter 42, the head 120 is inserted into the groove 118 at the second end 82 of the spool 36, the cutter 42 is slid to the end of the groove 118, and the set screw 122 is installed. When installed, the set screw 122 is flush with an outer surface of the spool 36.

The cutter 42 extends radially inward from the spool 36. The cutter 42 includes the cutting edge 44, and the cutting edge 44 is spaced radially inward from the spool 36. The cutting edge 44 engages the cylinder 40, specifically, is disposed in the notch 110. The cutter 42 is positioned to cut a circumferential channel into the cylinder 40 as the spool 36 rotates about the axis R relative to the cylinder 40. As the spool 36 rotates about the axis R relative to the cylinder 40, the cutting edge 44 cuts through the cylinder 40 beginning at the notch 110 and completes cutting the circumferential channel once the cutting edge 44 travels 360° about the axis R relative to the cylinder 40 and again reaches the notch 110.

Returning to FIG. 3, the retractor 46 may be an emergency locking retractor (ELR). In such an example, the retractor 46 includes a locking mechanism 112 movable between an engaged state and a disengaged state. In the engaged state, the locking mechanism 112 locks the second end 92 of the torsion bar 38 to the retractor housing 34, i.e., fixing the second end 92 of the torsion bar 38 relative to the retractor housing 34. In the disengaged state, the locking mechanism 112 permits rotation of the second end 92 of the torsion bar 38 relative to the retractor housing 34. When the locking mechanism 112 is in the disengaged state, the torsion bar 38 is rotatable with the spool 36 relative to the retractor housing 34.

For example, the locking mechanism 112 includes two pawl members 114 and a ratchet 116. The ratchet 116 is fixedly attached to the retractor housing 34, and the pawl members 114 are slidingly attached to the second end 92 of the torsion bar 38. The ratchet 116 includes a plurality of teeth, which are aligned circumferentially around and extend radially relative to the axis R. Each tooth includes a first side and a second side, wherein the first side has a shallower angle relative to a circumference of the ratchet 116 than the second side. When the pawl members 114 rotate relative to the ratchet 116 such that the first sides of the teeth are presented to the pawl members 114, the pawl members 114 slide over the teeth, and when the pawl members 114 rotate relative to the ratchet 116 such that the second sides of the teeth are presented to the pawl members 114, the pawl members 114 catch on the second side and prevents rotation of the pawl members 114.

The pawl members 114 are slidingly coupled to the second end 92 of the torsion bar 38. The pawl members 114 are movable between an unlocked position spaced from the ratchet 116 and a locked position engaging the ratchet 116. The pawl members 114 slide radially outward from the axis R to move from the unlocked position to the locked position.

The retractor 46 may include an activation sensor (not shown) that senses sudden deceleration of the vehicle 30 and triggers activation of the locking mechanism 112, e.g., the ratchet 116 and pawl members 114, to engage the second end 92 of the torsion bar 38, i.e., to move the locking mechanism 112 from the disengaged state to the engaged state. The activation sensor may be in communication with the pawl members 114, either directly or indirectly through a controller (not shown). The activation sensor may be located in the retractor 46 or elsewhere in the vehicle 30. In the retractor 46, the activation sensor may be, for example, a weighted pendulum, a centrifugal clutch, or any other suitable type. In the vehicle 30 outside the retractor 46, the activation sensor may be, for example, post-contact sensors such as accelerometers, pressure sensors, and contact switches; pre-impact sensors such as radar, LIDAR, and vision-sensing systems; or any other suitable type. The vision systems may include one or more cameras, CCD image sensors, CMOS image sensors, etc.

In the event of a sudden deceleration of the vehicle 30, the locking mechanism 112 moves from the disengaged state to the engaged state, which locks the second end 92 of the torsion bar 38 relative to the retractor housing 34. Momentum of the occupant's torso pulls on the shoulder band 68, which exerts a force on the webbing 58 tending to extract the webbing 58 from the retractor 46, i.e., unwind the spool 36, i.e., exert a torque on the spool 36 in an extractive direction. The cutter 42 is oriented such that when the spool 36 rotates in the extractive direction relative to the cylinder 40 about the axis R, the cutting edge 44 cuts into the cylinder 40. The extractive torque on the spool 36 causes the spool 36 and the first end 90 of the torsion bar 38 to rotate in the extractive direction, and the locking mechanism 112 in the engaged state causes the second end 92 of the torsion bar 38 and the cylinder 40 to remain stationary instead of rotating with the spool 36. During the first rotation of the spool 36, the cutter 42 cuts a circumferential channel through the cylinder 40, and at the same time, the middle portion 98 of the torsion bar 38 is twisted. During the second rotation and any further rotations of the spool 36, the middle portion 98 of the torsion bar 38 is further twisted, but the cutting edge 44 is disposed in the circumferential channel and no longer cuts the cylinder 40. The retractor 46 thus provides digressive load limiting because the resistance to extraction from cutting the cylinder 40 occurs during the first rotation but not during further rotations.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. "Substantially" as used herein means that a dimension, time duration, shape, or other adjective may vary slightly from what is described due to physical imperfections, power interruptions, variations in machining or other manufacturing, etc. Many modifications and variations of the present disclosure are possible in light of the above teachings, and the disclosure may be practiced otherwise than as specifically described.

What is claimed is:

1. A restraint system comprising:
   a retractor housing;
   a spool rotatably coupled to the retractor housing and defining an axis of rotation;
   a torsion bar elongated along the axis of rotation and positioned coaxially in the spool;
   a cylinder elongated along the axis of rotation, extending coaxially around the torsion bar, and positioned coaxially in the spool; and
   a cutter fixed to the spool, the cutter including a cutting edge engaging the cylinder.

2. The restraint system of claim 1, wherein the torsion bar is elongated along the axis of rotation from a first end to a second end, and the first end of the torsion bar is fixed relative to the spool.

3. The restraint system of claim 2, wherein the cylinder is elongated along the axis of rotation from a first end to a second end, and the second end of the cylinder is fixed to the second end of the torsion bar.

4. The restraint system of claim 3, wherein the first end of the cylinder is free.

5. The restraint system of claim 2, further comprising a locking mechanism movable between an engaged state and a disengaged state, wherein the locking mechanism in the engaged state locks the second end of the torsion bar to the retractor housing, and the locking mechanism in the disengaged state permits rotation of the second end of the torsion bar relative to the retractor housing.

6. The restraint system of claim 2, wherein the torsion bar includes a first-end portion extending along the axis of rotation from the first end, a second-end portion extending along the axis of rotation from the second end, and a middle portion extending along the axis of rotation from the first-end portion to the second-end portion, and a cross-sectional area of the middle portion along a plane orthogonal to the axis of rotation is smaller than a cross-sectional area of the second-end portion along a plane orthogonal to the axis of rotation.

7. The restraint system of claim 6, wherein the cross-sectional area of the middle portion along a plane orthogonal to the axis of rotation is smaller than a cross-sectional area of the first-end portion along a plane orthogonal to the axis of rotation.

8. The restraint system of claim 6, wherein the first-end portion, the second-end portion, and the middle portion are cylindrical, a diameter of the middle portion is shorter than a diameter of the second-end portion, and the diameter of the middle portion is shorter than a diameter of the first-end portion.

9. The restraint system of claim 6, wherein the cylinder extends from the first-end portion to the second-end portion.

10. The restraint system of claim 1, wherein the cylinder includes an outer surface facing radially outward and a notch extending radially inward from the outer surface, and the cutting edge is disposed in the notch.

11. The restraint system of claim 10, wherein the cylinder includes an inner surface facing radially inward, and the notch extends only partially from the outer surface to the inner surface.

12. The restraint system of claim 1, wherein the spool includes a slot, the restraint system further comprising webbing extending through the slot.

13. The restraint system of claim 12, wherein the slot is a first slot, the spool includes a second slot positioned more than 90° around the axis of rotation from the first slot, and the webbing extends from the first slot inside the spool to the second slot.

14. The restraint system of claim 1, further comprising a spring coupled to the spool and coupled to the retractor housing, wherein the spring is a coil spring.

15. The restraint system of claim 1, wherein the cutter is positioned to cut a circumferential channel into the cylinder as the spool rotates about the axis of rotation relative to the cylinder.

16. The restraint system of claim 1, wherein the cutter is oriented such that when the spool rotates in an extractive direction relative to the cylinder about the axis, the cutting edge cuts into the cylinder.

17. The restraint system of claim 16, further comprising a spring coupled to the spool and coupled to the retractor housing, wherein the spring is preloaded to apply a torque to the spool in a retractive direction opposite the extractive direction.

* * * * *